April 10, 1951     H. H. STECHMANN     2,548,848
READILY REMOVABLE WAY WIPING MEANS
Filed Oct. 22, 1945

*INVENTOR.*
H. H. STECHMANN
BY
Merrill M. Blackburn
*ATTORNEY*

Patented Apr. 10, 1951

2,548,848

UNITED STATES PATENT OFFICE 2,548,848

READILY REMOVABLE WAY WIPING MEANS

Herman H. Stechmann, Davenport, Iowa, assignor of one-half to William C. Uphoff, Moline, Ill.

Application October 22, 1945, Serial No. 623,784

5 Claims. (Cl. 308—3.5)

Generally speaking, this invention pertains to improvements in machine tools but, more specifically, it relates to means for wiping the guideways of such tools. Among the objects of this invention are the provision of an auxiliary wiper to be placed in front of the regular way wiper, the same being readily detachable for cleaning purposes; the provision of a readily removable auxiliary wiper for machine tool guideways; the provision of means which will make possible the daily cleaning of machine tool guideways without the expenditure of an undue amount of time for this purpose; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
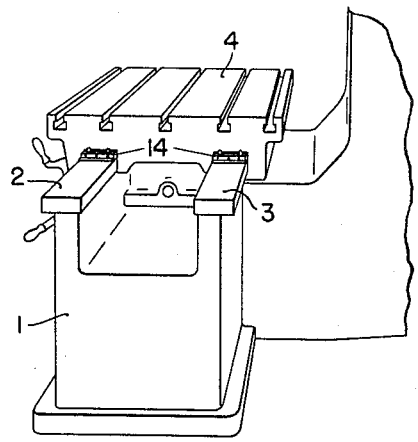
Fig. 1 is a fragmentary perspective view of a machine tool showing the location of my wiper thereon.

Reference will now be made in greater detail to the annexed drawings for a more complete description of this invention. In Fig. 1, I have shown the machine tool 1 as having a pair of ways 2 and 3 on which the bed 4 slides. Normally, a piece of felt or the like is held against the ways to keep metal chips and dust from accumulating and getting in between the sliding bed and its ways. It is the usual requirement that such wiper be removed once a day and cleaned in order to prevent particles from being rubbed along the ways and causing score lines therein, which lines gradually increase in size, making it necessary to re-surface the ways. However, with the wiper structures heretofore provided, there is more or less difficulty in removing these felts and replacing them. It is the purpose of this invention to make the wipers readily detachable so that the amount of time consumed in this operation is reduced to a minimum.

Figure 2:
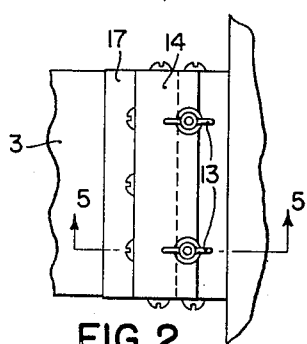
Fig. 2 is a fragmentary plan view looking down on one of the ways of Fig. 1 and on the wipers attached thereto.
Figures 5, 6:
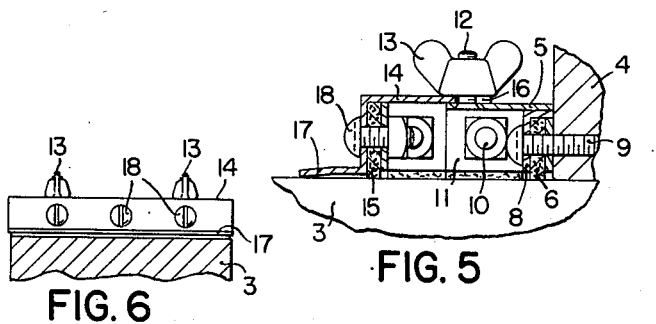
Fig. 5 represents a vertical transverse section taken substantially along the plane indicated by the line 5—5, Fig. 2.
Fig. 6 represents an elevation taken from the left hand side of Fig. 2.
Figure 3:
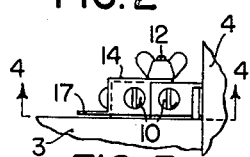
Fig. 3 is a fragmentary side elevation of the structure shown in Fig. 2.
Figure 7:
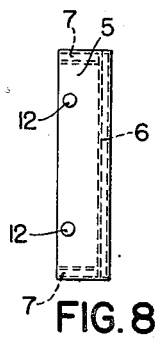
Fig. 7 represents a plan view of my new construction shown detached from the other parts.
Figure 8:
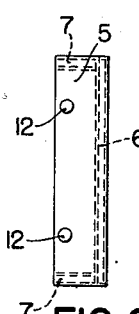
Fig. 8 represents a plan view of the primary way wiper to which the structure of Fig. 7 is to be attached.
Figure 4:
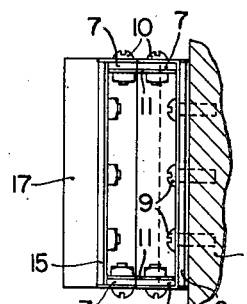
Fig. 4 represents a horizontal section taken substantially along the plane indicated by the line 4—4, Fig. 3.

The structure shown in Fig. 8 comprises a housing 5 which is provided along one side and two ends with felts 6 and 7, the former being held to the bed by an angular plate 8 and bolts 9 passing through the plate 8 and the felt 6, as shown most clearly in Figs. 4 and 5. Small bolts 10 pass through the ends of the housing 5, through the felts 7, and small holding plates 11. (See Fig. 5.) The purpose of the felts 7, which ride on the tops of the ways 2 and 3, at the lateral edges thereof, is to prevent detergent materials from entering the housing 5 at its ends and causing scratching of the ways. As shown in the drawings, bolts 12 are mounted in the top of the housing 5 and are provided with wing nuts 13 which can be quickly screwed down or unscrewed to fasten or release the housing 14 which houses the secondary wiper 15. The top of this housing 14 is provided with slots 16 so arranged as to receive the bolts 12 when the housing is put in place, as shown most clearly in Figs. 2 and 5.

The housing 14 has a projecting table 17, the purpose of which is to keep chips and other particles from falling on the guideway, as far as possible, and to push off the coarsest of them when they cannot be kept from falling on the ways. The felt 15 is secured to the housing 14 by a plurality of bolts 18, as shown clearly in Figs. 5 and 6. There are also felts 7 at the two ends of this housing which are held in place by bolts 10, as stated in connection with the felts at the two ends of the primary wiper. These additional felts are intended to keep undesirable materials from entering the two ends of the auxiliary housing 14.

It is apparent that, when it is desired to clean the auxiliary wiper 15, this can be readily done by loosening the two wing nuts 13 and sliding the housing 14 away from the main housing 5. A suitable brush and cleaning fluid can then be used to remove from the edge of the wiper 15 any pieces of metal or other materials tending to scratch the ways. When this has been done, the wiper can again be easily put into position and the wing nuts 13 be turned down tightly to hold the housing 14 in place. With this easily removable and replaceable way wiper element out in front of the regular wiper element, it is not necessary to clean the regular wiper so often. However, the regular wiper is in position to catch any undesirable particles which may be passed by the auxiliary wiper. It is desirable to remove the regular wiper occasionally but it is not necessary to do this as often as is necessary when there is no other wiper in front of the moving bed.

It is of course understood that the specific description of structure set forth above may be departed from without departing from the spirit of my invention as set forth in this specification and in the appended claims.

Having now described my invention, I claim:

1. A wiper for the purpose stated comprising a pair of readily disconnectible housings to be attached to the bed of a machine tool with their bottom edges separated slightly from a way, said housings having fabric wiping means attached to the lateral walls of the housings in positions to be moved along the way by the bed as it travels back and forth whereby to wipe from the way any particles which might tend to scratch the way if caught between the bed and the way, said fabric enclosing an open space above the way.

2. In a machine tool having a traveling bed and a primary way wiper attached to said bed; an auxiliary wiper detachably connected to the primary wiper, in front thereof, said auxiliary wiper having a housing and fabric wiping means, said housing having a notched edge for engagement with screw-threaded fastening means, and screw-threaded fastening means for securing the housing to the primary wiper.

3. A composite wiper for a guideway of a machine tool comprising a housing to be attached to the bed of the tool, said housing having a wiper fabric connected thereto in a position to contact the tool way when the bed is moved therealong, said housing having a forwardly projecting wall extending beyond the fabric, in combination with a secondary housing attached to and readily disconnectible from the forwardly projecting wall of the first housing, said secondary housing having a wiper fabric connected thereto for contact with the tool way when the bed is moved therealong, the secondary housing being readily removable from the first housing whereby access to the wiper fabric of the secondary housing may be had for cleaning purposes.

4. An attachment for a machine tool having a slidable bed, ways on which the bed slides, a guideway wiper connected to the bed and sliding on the ways, comprising a housing having a laterally extending wall with at least one notch in said wall, and a bolt corresponding to each notch in said wall projecting upwardly from said guideway wiper to cooperate with a notch or notches in a second housing, a second housing connected to the first housing, said bolt or bolts connecting and holding the two housings readily detachable from the guideway wiper, said housing having a wiper fabric supported therefrom in a position to contact the guideway in advance of the guideway wiper as the tool bed reciprocates along the ways.

5. An attachment for a machine tool having a slidable bed and ways on which the bed slides, comprising a two-section housing in which the sections are slidably connected for connection and disconnection by a relative sliding motion in the direction of the travel of the bed, and fastening means for securing the two sections together when connected, the bottom of the housing being open and the four walls bounding the open bottom being equipped with wiper fabric which contacts and wipes the adjacent way when the bed reciprocates.

HERMAN H. STECHMANN.

REFERENCES CITED

The following references are of record in the file of this patent:

UNITED STATES PATENTS

| Number | Name | Date |
|---|---|---|
| 509,864 | Booth | Dec. 5, 1893 |
| 680,345 | Morrison | Aug. 13, 1901 |
| 955,897 | Noe | Apr. 20, 1910 |
| 1,314,967 | McKee | Sept. 2, 1919 |
| 1,676,311 | Zimmerman | July 10, 1928 |
| 1,938,786 | Vancil | Dec. 12, 1933 |
| 1,991,177 | Rutz et al. | Feb. 12, 1935 |